Feb. 8, 1944.   J. L. HALL   2,341,320
METHOD OF TREATING HYDROCARBON GASES
Filed June 12, 1940
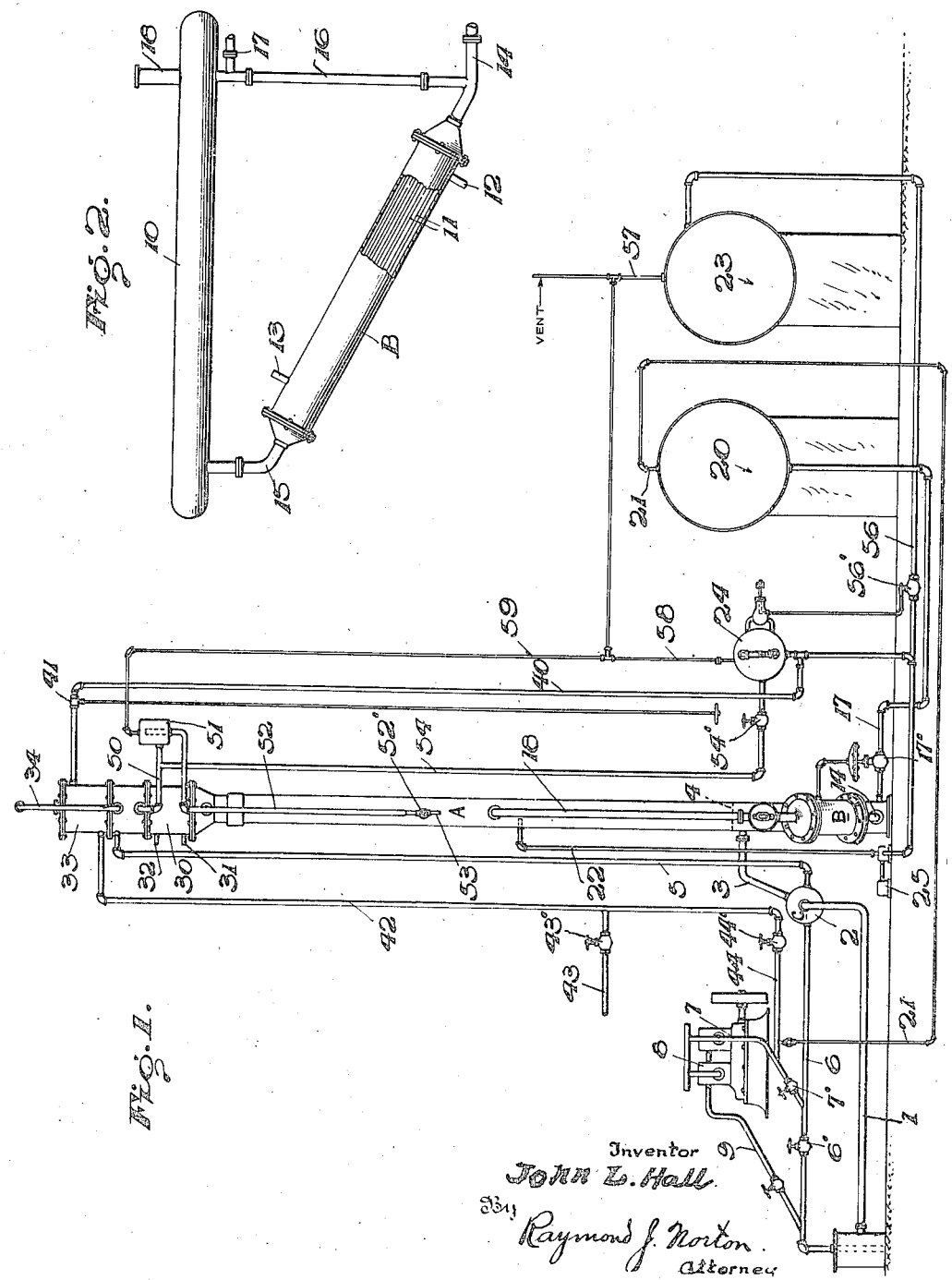
Inventor
John L. Hall
By Raymond J. Norton
Attorney Patented Feb. 8, 1944

2,341,320

UNITED STATES PATENT OFFICE 2,341,320

METHOD OF TREATING HYDROCARBON GASES

John L. Hall, Charleston, W. Va., assignor of one-half to Danciger Oil and Refineries, Inc., Fort Worth, Tex., a corporation of Texas Application June 12, 1940, Serial No. 340,221

8 Claims. (Cl. 62—175.5)

This invention relates to a method of treating hydrocarbon gases to recover valuable constituents thereof. In a more specific aspect the invention relates to a process of separating and recovering valuable constituents of hydrocarbon gas mixtures such as dry gas, casinghead gas and the like.

The present invention deals particularly with the treatment of hydrocarbon gas under a relatively high pressure but at a pressure below that at which the phenomenon known as retrograde condensation is exhibited.

In the past many attempts have been proposed for effecting the separation of hydrocarbon liquids from natural and artificial gas mixtures. Such earlier methods involved the utilization of apparatus of large volumetric capacity and necessitated a relatively large equipment with high installation and operating cost. As a result of extensive research in this field it has been found that such gaseous mixtures may be treated in a simple, compact unit to achieve an effective fractionation of the gas and recovery of valuable marketable products.

The present invention is in part based on discoveries explained in the copending application of John L. Hall, Serial No. 311,415, filed December 28, 1939, and to the extent of the common subject matter is a continuation in part of such earlier application.

The present process involves the treatment of relatively high pressure gases, especially dry natural gas and casinghead gas at elevated pressures but at pressures below those at which retrograde condensation interferes with the recovery of the desired hydrocarbons. Where the well pressure of the gas to be treated is below that at which retrograde condensation would occur the gas may be fractionated in the same manner subsequently to be described at substantially well pressure. In the utilization of the invention for treatment of gases whose pressure is at or above that at which retrograde condensation occurs the improved process may be employed by first reducing the pressure of the gas to a predetermined extent and then fractionating the gas.

The novel fractionation method involves the passage of the gas through a fractionating stage in the first or initial zone of which the preliminarily cooled gas is subjected to a direct scrubbing with a specially fractionating reflux liquid, which liquid condenses and absorbs higher boiling constituents of the incoming gas and in the second zone of which the partially fractionated gas is further rectified by indirect heat exchange with an expanded condensate fraction. The fractionation of the reflux condensate is preferably effected exteriorly of the column but at the prevailing pressure in the fractionating column and such fractionation is conducted so as to strip the condensate of lighter ends. Such lighter ends are then reintroduced into the tower at a point above the zone of preliminary condensation. In these circumstances a high partial pressure of the lighter constituents of the incoming gas obtains in the upper zone of the tower and when such lighter fractions are cooled they are considerably densified. The cooled densified gas preferably is utilized, through the medium of an indirect heat exchanger to cool incoming raw gas and may then be employed to repressure a producing horizon or utilized in any other desired manner.

The operation of the process will be more readily comprehended from a consideration of a preferred type of fractionating apparatus as shown in the accompanying drawing, in which Figure 1 is an elevation view of the fractionating tower and associated units and Figure 2 is an enlarged detail of the reboiler unit of Figure 1.

As shown in the drawing the major units of the apparatus include a fractionating column A, a reboiler unit B and a heat exchanger C.

The fractionating tower A may be of any suitable size and in an illustrative embodiment comprises a tower about 53 feet high about 10 inches in diameter. The tower preferably is provided with contact surfaces and for this purpose is packed with iron Rashig rings. The tower, together with the heat exchanger C and reboiler B, is maintained under pressure and the system is adapted to fractionate incoming gases substantially under pressures obtaining in the well up to that point where retrograde condensation does not interfere with the recovery of the desired liquid hydrocarbons.

The fractionating system is connected to a gas well or other source of high pressure gas through the line 1. This line enters the heat exchanger 2 and is connected at its discharge end to the gas line 3 which communicates with the tower A at a low point and below the baffle plate 4. The raw gas entering the heat exchanger is cooled by indirect heat exchange with cool densified and rectified gas entering through line 5. After passing through the heat exchanger the dense gas may be utilized to repressure the well by passing directly to the well through line 6 controlled by valve 6'. If it is desired to increase the pressure of the rectified gas prior to introduction into the well it may be by-passed, through line 7, controlled by valve 7', to compressor 8 and then to the well through branch line 9. This cooling circuit thus comprises a closed cycle in which incoming raw gas under high pressure is cooled by indirect heat exchange with a cooled stripped light fraction of such gas which light fraction is returned cyclically to the well or other source of supply. Obviously the gas passing through line 6 may be diverted wholly or in part and utilized for any other purpose. If desired a steam heated shell and tube preheater may be interposed in line 1 to control the temperature of the incoming gas.

As indicated previously the improved process, among other features, involves a special fractionation of condensate formed in the lower section of the tower or the primary fractionation zone. This is achieved by means of an improved reboiler circuit. As shown particularly in Figure 2 the reboiler circuit includes the inclined reboiler tank B and the upper communication tank 10. The tank B preferably is of the shell and tube type and is provided internally with the bank of tubes 11 through which condensate flows and is heated. A heating medium such as steam, may be circulated through the shell by means of the steam connections 12 and 13. The reboiler B is connected at its lower portion to the base or kettle portion of column A through the line 15. The reboiler circuit is completed by line 16 connected at its ends to the tank 10 and line 14 respectively. A drawoff line 17 controlled by valve 17' is connected to the reboiler circuit so as to withdraw a predetermined quantity of the condensate from the circuit.

As described hereinbefore a function of the reboiler circuit is to fractionate the condensate collecting in the base of the tower and to separate lighter gaseous components and reintroduce these into the tower. This is accomplished, as shown, by means of the vapor line 18 which is connected at one end to an upper portion of tank 10 and at its other end to the tower A above the point of introduction of liquid reflux.

The fractionated liquid products accumulating in the reboiler system are withdrawn through the line 17 controlled by liquid level valve 17' and passed to the weathering tank 20. In normal operation of the process such liquid products may comprise pentane and heavier homologues. During weathering, lighter fractions which may be evolved in tank 20 are passed through line 21 and may be suitably disposed of as for example by passage to the suction side of the compressor.

In passage upwardly through the fractionating column the raw gases, after being preliminarily cooled in the heat exchanger 2 enter the lower portion of the tower through line 3. In this lower portion or zone of the tower the gases are directly contacted with a refluxing medium admitted to the tower through line 22. This refluxing medium which comprises a special condensate fraction is withdrawn from the surge tank 24 by means of pump 25 and forced into the tower. It is particularly to be observed that the point of introduction of the refluxing liquid is below the point of introduction of the stripped gases admitted through line 18.

In passage upwardly through the tower the gases are cooled by indirect heat exchange in the cooler 30. This cooler may be of any suitable design such as the shell and tube type. A cooling medium such as water may be circulated through the cooler by means of the connections 31 and 32. Serially connected with the cooler 30 is cooler 33. Gases in their upward passage through the tower and after having their temperature reduced in cooler 30 pass outwardly of the tower through line 34 and thence downwardly through the upper cooler 33. The cooler 33 which preferably is of the internal tube type is adapted to be cooled by a special cooling medium.

Such a medium comprises a special fraction of the condensate, preferably composed essentially of propane and butane. This fraction is withdrawn from the surge tank 24 and is passed to the line 40 and pressure reduction valve 41 through the shell of the upper cooler 33. When such condensate, which is maintained substantially under the pressure prevailing in the system, is expanded in valve 41 it abstracts heat from the gases passing downwardly through the upper cooler and drastically reduces the temperature of such gases. After expansion in the shell of cooler 33 the expanded material is withdrawn through line 42. This fraction may be diverted from the system through line 43 controlled by valve 43' and may be passed to a fractionating unit for separation of the individual constituents or may be passed to an associated unit for the production of polymer gasoline. In the event that it is not desired to directly utilize this fraction it may be continuously passed through the branch 44, controlled by valve 44', to the suction side of the compressor and returned to the well.

The rectified gases passing upwardly through the tower and which are drastically cooled in the upper section, as noted previously, passes downwardly through line 5 and serve as an effective cooling medium in the heat exchanger 2.

In the upper section of the tower, during the sequential cooling described, certain of the vaporized and/or entrained heavier constituents are condensed out. Such condensate may be withdrawn from the tower through the line 50 and wier box 51 and reintroduced into the upper section of the tower through the line 52 controlled by make valve 52' to as to serve as a refluxing medium. Temperature control in the upper section of the tower may be facilitated by controlling the amount of refluxing medium admitted to the upper section. This may be done by withdrawing a predetermined amount of the condensate through the make line 53 or line 54, controlled by valve 54' and passing it to the surge tank 24.

Surge tank 24 as shown is connected to the propane-butane storage tank 23 by the line 55. A desired constant liquid level may be maintained in the tank 24 by means of the liquid level-control valve 56' which automatically controls the amount of liquid fed from storage tank 23 to surge tank 24.

In order to establish an isopiestic system, storage tank 23 and surge tank 24 may be provided with vents 57 and 58 respectively which connect with the common vent 59 which bleeds into the wier box 51.

It will be understood that a branch not shown from line 43 may be connected, through a compressor, with the storage tank 23 to return any desired amount of this fraction to the storage tank while maintaining the desired high pressure on the system.

The operation of the process will have been appreciated from the foregoing description. In starting up the process the tower A is first charged with a mixture of butane, propane and pentane. A raw natural or artificial gas mixture from a primary source such as a gas well, at well temperature and at an elevated pressure of the order of from about 200 pounds per square inch up to that pressure at which retrograde condensation interferes with the desired controlled fractional condensation (of the approximate order of 750 pounds per square inch) is fed through line 1, heat exchanger 2 and line 3 to the lower or primary fractionating zone of the column. Where the initial pressure of the gas to be treated is relatively low a booster compressor may be interposed in line 1.

The high pressure cooled gas passes upwardly through the tower and its first contacted and directly scrubbed with a fractionated liquid condensate introduced through line 22. In this primary condensation zone, under the scrubbing action constituents of the raw gas equivalent to the scrubbing medium, as well as those of a lower boiling point, are condensed and absorbed and flow to the bottom of the tower. This initial condensate which is richer in heavier constituents and poorer in lighter constituents than the raw gas is then continuously withdrawn from the tower and subjected to a contemporaneous but separate controlled fractionation. This controlled fractionation is achieved, as previously noted, in the reboiler system. The initial condensate feeds by gravity into the lower portion of reboiler B, through line 14 and in passing upwardly through the reboiler is indirectly heated by the heating medium. Due to the increment of heat added in the heat exchanger, a thermal circulation of the condensate is initiated. The heated condensate flows upwardly through the line 15 to the enlarged area in tank 10. Due to the increase of temperature of the condensate and to its passage from the constricted area of reboiler B to the enlarged quiescent area of tank 10 lighter constituents of the condensate are evolved. In a preferred operation the temperature in the reboiler system is controlled such that lighter constituents including methane, ethane, propane and butane are vaporized. These lighter constituents pass overhead through the line 18 and are reintroduced into the tower above the primary condensation zone. The unvaporized fraction of the circulating condensate, i. e. constituents of the characteristics of pentane and heavier, are continuously withdrawn and pass to the storage tank 20. From this tank this fraction may be withdrawn for direct marketing or may be subjected to any desired type of processing.

In the upper section of the tower the lighter ends of the raw gas entering mixture are subjected to sequential cooling. As previously explained, the lighter fractions are preliminarily cooled in the cooler 30 and then are passed through line 34 to the refrigeration cooler 33. Heavier constituents knocked back during this cooling are continuously returned to the upper section of the tower through lines 50 and 52. During passage through the refrigeration cooler 33 the temperature of the rectified gas is markedly reduced and the residual gas, now consisting essentially of methane and ethane, passes outwardly through the line 5, is utilized as an effective cooling medium in heat exchanger 2 and is then fed back into the well, or otherwise employed.

During this operation drastic cooling and consequent rectification of the gases is effected by withdrawing a light fraction consisting for example essentially of propane and butane under the prevailing pressure in the system and expanding this, through the medium of the reduction valve into refrigeration cooler 33. The vapors and liquid resulting from this expansion are withdrawn through line 42 and utilized as previously described.

With this type of operation the fractionation is found to be very effective. In a typical operation the well gas at a well temperature of the order of 80° F. is sharply fractionated and a rectified gas consisting essentially of methane and ethane and at a temperature of the order of —5° F. is discharged from the system. Under the conditions of temperature and pressure control obtaining in the system this discharged gas is of a density which greatly facilitates well repressuring. It will be observed that during the operation the entering mixture is segregated into several different fractions each of which is effectively employed in fractionating the gas. It is thus apparent that the system is of a self-contained as well as of a isopiestic type.

It has been found that the type and size of the contact material used in the tower is of considerable importance. In a preferred method of operation the tower is packed with relatively large size metal Rashig rings from the baffle plate 4 to about the top of pipe 18. From this point to within about a foot of the top of the column the column is preferably filled with smaller metal rings. The material of which the contact surfaces is composed similarly is very important. While no precise rationale of this importance is given it would appear that the thermal characteristics of the packing material, such as its heat conductivity play a role in effective fractionation. It has been established, for example, that other conditions being equal, non-metallic packing material, such as porcelain, is not nearly as efficient as metallic rings. Furthermore there is a decided differential efficiency as between different metallic compositions. Copper and iron either singly or in combination produces very satisfactory results for the tower packing. Ferrous alloy, such as a stainless steel composed of 18 parts of nickel, 18 of chromium and 74 of iron is satisfactory but is not as efficient as rings made of Monel metal. Rings composed of a high chromium iron, without nickel, are more efficient than the nickel-bearing stainless type of steel but not as efficient as the Monel metal. Although as explained, the particular physical phenomenon involved is not entirely clear it is a fact that the character of the packing material is of not inconsiderable importance in achieving best results. These metallic surfaces may, for the sake of a term, be called fractionation accelerators. The efficiency of these materials is particularly apparent in the more difficult fractionations, that is to say fractionations of gas compositions at pressures in or above the retrograde range. In a preferred mode of operation, therefore, metallic surfaces, such as those composed of iron or its alloy and/or copper or its alloys or other equivalent metallic compositions are employed. Also, as indicated the packing in the tower preferably is so established that larger rings, having less resistance to gas flow are utilized in the lower portion of the tower or the primary condensation zone and smaller rings in the upper or secondary condensation zone.

It will be understood that when it is desired to utilize the improved process for treating casinghead gases a separator is interposed between the well and fractionating tower to remove the heavy oil prior to fractionation of the gases.

While a preferred method of operation has been described it will be understood that this is given to exemplify the underlying principles involved and not as the exclusive method by which such principles may be effectuated.

I claim:

1. The process of treating high pressure natural gas which gas is at a pressure below which retrograde condensation would occur to recover liquefiable constituents thereof which comprises passing the gas from a well to a fractionating zone maintained under substantially well pressure, cooling the gas in transit to the zone, directly contacting the gases in the lower section of the zone with a scrubbing liquid consisting of heavier constituents of the gas mixture, cooling the residual gas in the upper section of the zone by indirect heat exchange with an expanded intermediate fraction of condenser constituents and separately withdrawing from the fractionating zone a rectified gas fraction, the said expanded intermediate fraction and the heavy constituent fraction.

2. The process of treating natural gas to recover liquefiable constituents thereof which comprises passing the gas to a fractionating zone maintained at elevated pressure but below that pressure at which retrograde condensation would occur, cooling the gas in transit to the zone, contacting the gas in the lower portion of the zone with a recirculating stream of reflux liquid consisting of liquefiable constituents of the gas substantially stripped of lighter gaseous constituents, removing the condensate from the zone and continuously heating the condensate, withdrawing from the condensate the lighter fractions and returning the lighter fractions and stripped condensate to the zone.

3. The process of treating natural gas to recover liquefiable constituents thereof which comprises passing the gas to a fractionating zone maintained at elevated pressure but below that pressure at which retrograde condensation would occur, cooling the gas in transit to the zone, contacting the gas in the lower portion of the zone with a recirculating stream of reflux liquid consisting of liquefiable constituents of the gas substantially stripped of lighter gaseous constituents, removing the condensate from the zone and continuously heating the condensate, withdrawing from the condensate the lighter fractions and returning the lighter fractions and stripped condensate to the zone at spaced points therein.

4. The process of treating natural gas to recover liquefiable constituents thereof which comprises passing the gas to a fractionating zone maintained at elevated pressure but below that pressure at which retrograde condensation would occur, cooling the gas in transit to the zone, contacting the gas in the lower portion of the zone with a recirculating stream of reflux liquid consisting of liquefiable constituents of the gas substantially stripped of lighter gaseous constituents, removing the condensate from the zone and continuously heating the condensate, withdrawing from the condensate the lighter fractions and returning the condensate to a low section of the zone and the lighter fractions to a higher section of the zone.

5. A process of treating natural gas to recover liquefiable constituents thereof which comprises passing the gas which gas is at a pressure below which retrograde condensation would occur from a well to a zone maintained under substantially well pressure, cooling the gas in transit to the zone, contacting the gas in the lower portion of the zone with a recirculating stream of refluxing liquid consisting of liquefiable components of the gas having the characteristics of propane and heavier constituents, withdrawing condensate from the lower portion of the zone, heating such condensate and removing therefrom constituents lighter than propane, introducing such lighter constituents into the zone at a point above the introduction of reflux liquid, withdrawing from the system a heavier liquefied fraction consisting of pentane and heavier hydrocarbons, contacting gases in the upper section of the zone by indirect heat exchange wtih an expanded fraction consisting primarily of propane and butane, withdrawing a cooled dense gas fraction from the upper section of the zone and separately withdrawing such expanded fraction.

6. A process of recovering liquefiable constituents from natural gas which gas is at a pressure below which retrograde condensation would occur which comprises passing gas directly from a well to a fractionating zone which is maintained under substantially well pressure, cooling the gas in transit to the zone by indirect heat exchange with a cooled rectified gas fraction, scrubbing cooled entering gas in the lower portion of the zone with a reflux liquid consisting of liquefied heavier constituents of the gas substantially free from methane and ethane, withdrawing a liquid fraction consisting of the heavier liquefiable constituents from the lower section of the zone, cooling the gas in the upper section of the zone by indirect heat exchange with an expanded liquefied fraction and separately withdrawing from the zone a cooled gas fraction and said expanded fraction.

7. A process of treating high pressure natural gas which gas is at a pressure below which retrograde condensation would occur to recover valuable liquefiable constituents thereof and to repressure the producing horizon which comprises, passing raw gas from a well of the horizon to a fractionating zone in which the gases are maintained under elevated pressure, scrubbing the gas in the lower portion of the zone with a scrubbing liquid consisting of heavier liquefiable constituents, cooling the gases in the upper section of the zone by indirect heat exchange with an expanded liquid intermediate fraction, separately withdrawing from the system such heavier fraction, the intermediate expanded fraction and a rectified cool gas fraction and utilizing the cooled gas fraction for repressuring the producing horizon.

8. A process of recovering liquefiable constituents from raw natural gases which comprises passing the gas to a fractionating zone maintained at a pressure of the order of below substantially 780 lbs. per square inch, cooling the gases in transit to the zone, scrubbing the gases in the lower section of the zone with a scrubbing liquid consisting of constituents having the characteristics of propane and butane, withdrawing the scrubbing liquid from the base of the zone and heating said liquid to evolve constituents lighter than propane, returning said lighter constituents to the zone above the point of introduction of the reflux liquid, passing a liquid fraction consisting substantially of propane and butane to the upper section of the tower and expanding it into a heat exchange coil to thereby cool the gases in the upper section of the tower by indirect heat exchange, withdrawing said cool gases and utilizing such cool gases as an indirect cooling medium for incoming raw gases, withdrawing the expanded fraction from the system and separately withdrawing a residual heavy fraction consisting essentially of pentane and heavier hydrocarbons.

JOHN L. HALL.